United States Patent
Cuddy et al.

(10) Patent No.: US 9,142,082 B2
(45) Date of Patent: *Sep. 22, 2015

(54) MULTI-ACTION SWITCH FOR A GAMING DEVICE

(71) Applicant: Video Gaming Technologies, Inc., Franklin, TN (US)

(72) Inventors: Ryan Cuddy, Reno, NV (US); Mike Oberberger, Franklin, TN (US)

(73) Assignee: Video Gaming Technologies, Inc., Franklin, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 14/498,399

(22) Filed: Sep. 26, 2014

(65) Prior Publication Data

US 2015/0018067 A1 Jan. 15, 2015

Related U.S. Application Data

(63) Continuation of application No. 13/630,671, filed on Sep. 28, 2012, now Pat. No. 8,961,310.

(51) Int. Cl.
*G07F 17/00* (2006.01)
*G07F 19/00* (2006.01)
*G07F 17/32* (2006.01)
*A63F 13/218* (2014.01)
*A63F 9/24* (2006.01)

(52) U.S. Cl.
CPC .............. *G07F 17/3209* (2013.01); *A63F 9/24* (2013.01); *A63F 13/218* (2014.09); *G07F 17/3211* (2013.01)

(58) Field of Classification Search
CPC ................... A63F 2300/10; A63F 2300/1025; A63F 2300/1043; A63F 2300/1056; G07F 17/32; G07F 17/3209; G07F 17/3216; G07F 17/326; G07F 17/3262
See application file for complete search history.

(56) References Cited

U.S. PATENT DOCUMENTS

| | | | |
|---|---|---|---|
| 4,348,556 | A | 9/1982 | Gettig et al. |
| 4,816,671 | A | 3/1989 | Umemura |
| 5,115,108 | A | 5/1992 | Ogawa et al. |
| 5,408,058 | A | 4/1995 | Homik et al. |
| 6,157,026 | A | 12/2000 | Redmer et al. |
| 6,454,649 | B1 | 9/2002 | Mattice et al. |
| 6,780,112 | B2 | 8/2004 | Kikukawa et al. |
| 6,998,557 | B2 | 2/2006 | McGuffin-Noll |
| 7,060,920 | B2 | 6/2006 | Serizawa et al. |
| 7,641,552 | B2 * | 1/2010 | Manz .............. 463/37 |
| 7,828,658 | B2 * | 11/2010 | Manz .............. 463/36 |
| 2005/0059458 | A1 | 3/2005 | Griswold et al. |
| 2005/0059470 | A1 | 3/2005 | Cannon |
| 2006/0247048 | A1 | 11/2006 | Mitchell et al. |
| 2009/0156296 | A1 | 6/2009 | Manz |

* cited by examiner

*Primary Examiner* — Milap Shah
(74) *Attorney, Agent, or Firm* — Armstrong Teasdale LLP

(57) ABSTRACT

A gaming machine that includes a multi-action switch that is held in an initial position when the multi-action switch is not being pressed, and a position detection device for detecting whether the multi-action switch is in a first position, a second position, or a third position. The gaming machine further includes a controller for controlling operations of the gaming machine in accordance with the position of the multi-action switch, such that the gaming machine carries out a first operation when the position detecting device detects that the multi-action switch has reached the first position, a second operation when the position detecting device detects that the multi-action switch has reached the second position, and a third operation when the position detecting device detects that the multi-action switch has reached the third position.

20 Claims, 6 Drawing Sheets

MULTI-ACTION SWITCH FOR A GAMING DEVICE

CROSS-REFERENCE TO RELATED APPLICATIONS

This application is a Continuation of U.S. patent application Ser. No. 13/630,671 filed Sep. 28, 2012, now U.S. Pat. No. 8,961,310 which is incorporated by reference herein.

BACKGROUND OF THE INVENTION

The embodiments described herein relate generally to gaming machines and, more particularly, to systems and methods for enabling a player to execute a plurality of inputs through a multi-action switch on a gaming machine.

Commercial or "wager" based gaming continues to grow in popularity. A variety of gaming machines have been developed over the years for presenting games offering a chance for the player to win an award of monies or a representation of monetary value. These machines include old mechanical slot machines, newer electromechanical slot machines, as well as video gaming machines, such as video poker machines.

All gaming machines include one or more devices for accepting player input. For example, slot machines often include a "spin" button or an "arm." Depressing the spin button or pulling the arm is associated with a single particular input, that of effecting rotation of the physical or simulated reels of the slot machine. Video poker machines include "hold" buttons which each define a singular, unique input, that of designating a card to be held in a draw poker game.

Class II gaming includes a game of chance commonly known as bingo. Currently, various implementations of Class II games exist. In one implementation of a bingo-based Class II game, a player must provide multiple inputs in order to initiate the game and participate in the game. In particular, a player must first provide a "bet" input in order to indicate a desire to participate in the multi-player game. Each player of the game is assigned a bingo card and one or more balls are drawn. In order for a player's card to be marked or "daubed" in the event selected balls match numbers on the player's card, the player must provide a "daub" input.

Generally, play of the game continues until a player receives a game-ending winning pattern. Normally, the number of balls which are initially drawn total less than the number which are necessary to receive the game-ending pattern. Thus, after the initial one or more balls are drawn, additional balls are drawn until one or more players of the game receive the game-ending "bingo" pattern outcome. In this configuration, each time additional balls are drawn, the player must again provide a "daub" input in order to mark matching drawn ball numbers with their card numbers. In some instances, a player must also provide a "claim" input in order to claim winnings when a winning pattern is received. These inputs, bet, daub, and claim are provided by individual instances of a player depressing one or more buttons on the gaming machine.

As with all games, it is desirable to make Class II bingo games more exciting. For example, Class II game results are now often represented by secondary, exciting events. The outcome of a bingo game may be represented as a winning or losing spin of simulated slot reels. In this configuration, the player gets to experience the bingo game as a slot-type event, including the excitement of having the reels spin and awaiting the results of the spin in order to learn of the outcome of the game. Unfortunately, the button presses required of the player in order to play the bingo portion of the game detracts from the game play experience.

BRIEF DESCRIPTION OF THE INVENTION

In one aspect, a gaming machine is provided. The gaming machine includes a display device configured to display a bingo-based game, a multi-action switch including a body moveable along a fixed path, wherein the body of the multi-action switch is held in an initial position when the body of the multi-action switch is not being pressed, and wherein the fixed path includes a first position at a first distance from the initial position, a second position at a second distance from the initial position, and a third position at a third distance from the initial position, a position detection device configured to detect whether the body of the switch is in the initial position, the first position, the second position, or the third position along the fixed path when the body of the multi-action switch is being pressed, and a controller configured to control operations of the gaming machine in accordance with the position of the multi-action switch, such that the gaming machine carries out a first operation when the position detecting device detects that the multi-action switch has reached the first position, a second operation when the position detecting device detects that the multi-action switch has reached the second position, and a third operation when the position detecting device detects that the multi-action switch has reached the third position.

In another aspect, a method for enabling a player to execute a plurality of inputs through a multi-action switch on a gaming machine is provided. The multi-action switch including a body moveable along a fixed path, the fixed path including an initial position at which the body of the multi-action switch is held when force is not applied to the body, a first position at a first distance along the fixed path from the initial position, a second position at a second distance along the fixed path from the initial position, and a third position at a third distance along the fixed path from the initial position. The method includes providing, by one or more processors, a bingo-based game, determining, by the one or more processors, that the body of the multi-action switch has reached one or more of the following along the fixed path when force is applied to the body of the multi-action switch: the first position, the second position, and the third position, and executing, by the one or more processors, one or more inputs for the bingo-based game in response to the determination that the body of the multi-action switch has reached one or more of the following: the first position, the second position, and the third position.

In yet another aspect, a multi-action switch that enables a player to execute a plurality of different inputs in a game of chance is provided. The multi-action switch includes a button comprising a top surface, the button configured to be moveable down a fixed path by applying force to the top surface of the button, the fixed path including an initial position at which the button is held when force is not applied to the top surface, a first position at a first distance from the initial position, a second position at a second distance from the initial position, and a third position at a third distance from the initial position, and a position detecting device. The position detecting device is configured to detect when the button has reached at least one position along the fixed path when force is applied to the top surface of the button, and in response to detecting the button has reached the third position executing one or more of the following: a first operation, a second operation, and a third operation, wherein the first operation is a bet operation, the second operation is a daub operation, and the third operation is a claim operation.

DETAILED DESCRIPTION OF THE INVENTION

Exemplary embodiments of systems and methods for use in enabling a player to execute a plurality of inputs through a multi-action switch on a gaming machine are described herein. In particular, the embodiments described herein provide player input to a gaming machine configured to present a Class II game and, more particularly, a bingo-based game. In one embodiment, the game is configured to require a player to provide multiple inputs in order for the player to play the game. For example, in a bingo-based game, the player may provide at least one input to initiate the game (e.g., place a "bet"), at least one input to "daub" and "claim", and optionally, at least one additional input to make a "claim" separately from making a "daub". Thus, while multiple inputs could be provided by the player pushing a single button multiple times or several different buttons once, embodiments of the present disclosure enable a player to provide multiple inputs with only one press of a button (e.g., a multi-action switch). However, it will be appreciated that the systems and methods described herein have applicability to games where a greater or lesser number of player inputs are required.

Exemplary technical effects of systems and methods described herein include at least one of: (a) providing a bingo-based game; (b) determining that a multi-action switch has reached a particular position along a fixed path; and (c) executing one or more inputs for the bingo-based game in response to the determination that the multi-action switch has reached the particular position.

Figure 1:
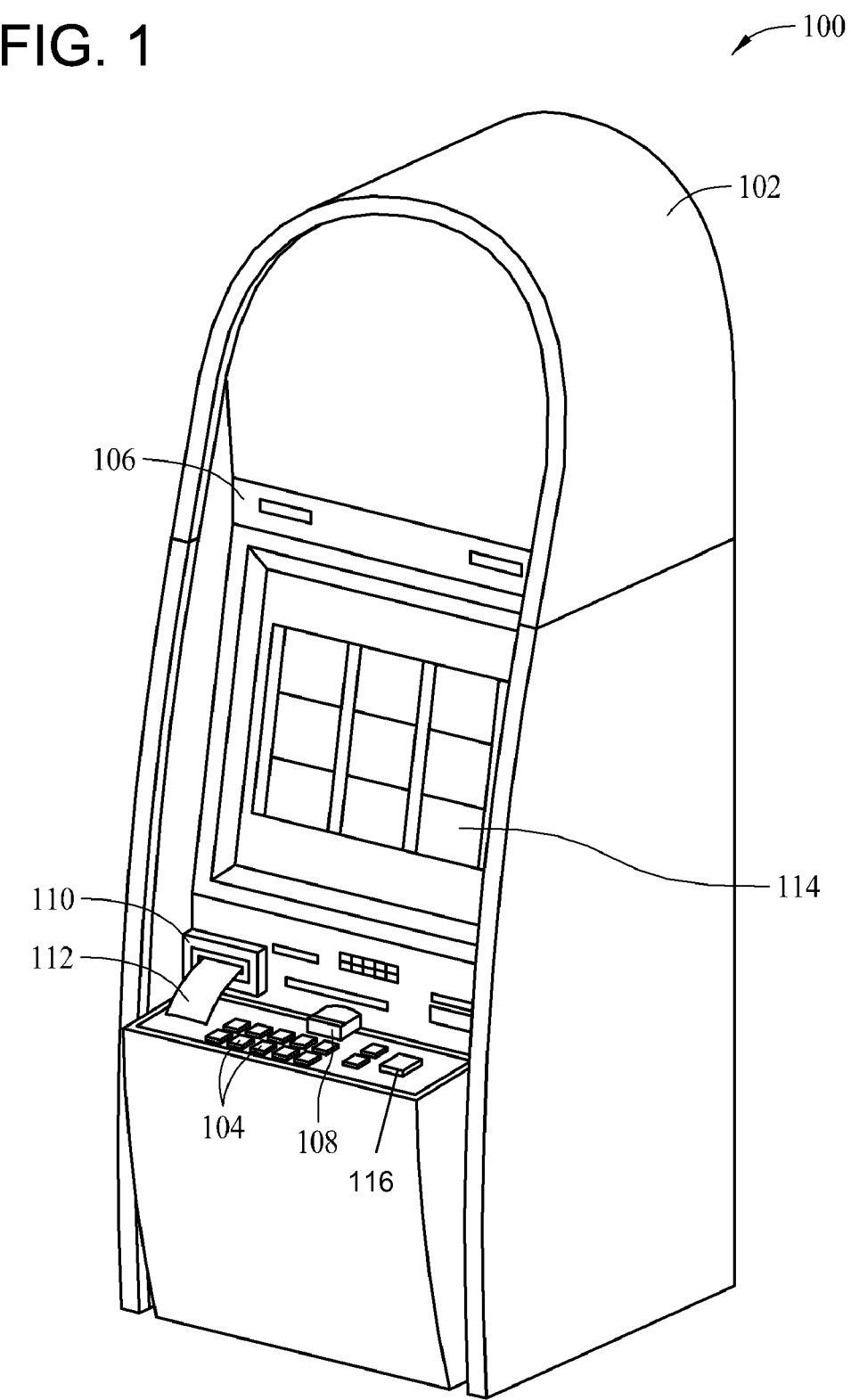
FIG. 1 is a schematic diagram of an exemplary gaming machine.

FIG. 1 is a schematic diagram of an exemplary gaming machine 100 that facilitates enabling a player to execute a plurality of inputs in a game of chance through a multi-action switch. Gaming machine 100 may be any type of gaming machine, and may include, without limitation, different structures than those shown in FIG. 1. Moreover, gaming machine 100 may employ different methods of operation than those described below.

In the exemplary embodiment, gaming machine 100 includes a cabinet 102 configured to house a plurality of components, such as a gaming machine controller, peripheral devices, presentation devices, and player interaction devices. For example, in an exemplary embodiment, gaming machine 100 includes a plurality of input devices, such as switches and/or buttons 104 that are coupled to a front 106 of cabinet 102. Buttons 104 may be used to start play of a primary or secondary game. One button 104 may be a "Bet One" button that enables the player to place a bet or to increase a bet. Another button 104 may be a "Bet Max" button that enables the player to bet a maximum permitted wager. Yet another button 104 may be a "Cash Out" button that enables the player to receive a cash payment or other suitable form of payment, such as a ticket or voucher, which corresponds to a number of remaining credits.

In addition to buttons 104, or in replace of at least some of buttons 104, gaming machine 100 further includes multi-action switch 116. Multi-action switch 116 enables a player to generate or provide multiple inputs as a result of pressing, only once, multi-action switch 116 down one or more defined distances. For example, as described in further detail below, with respect to a bingo-based game, the inputs of "bet", "daub", and "claim" may each be achieved by a pressing multi-action switch 116 down one or more a defined distances.

In the exemplary embodiment, gaming machine 100 also includes a coin acceptor 108 for accepting coins and/or tokens, and a bill acceptor 110 for accepting and/or validating cash bills, coupons, and/or ticket vouchers 112. Bill acceptor 110 may also be capable of printing tickets 112. Furthermore, in some embodiments, bill acceptor 110 includes a card reader or validator for use with credit cards, debit cards, identification cards, and/or smart cards. The cards accepted by bill acceptor 110 may include a magnetic strip and/or a preprogrammed microchip that includes a player's identification, credit totals, and any other relevant information that may be used. Moreover, in the exemplary embodiment, gaming machine 100 includes one or more presentation devices 114. Presentation devices 114 are mounted to cabinet 102, and may include a primary presentation device for displaying a primary game and a secondary presentation device for displaying a secondary or bonus game. Presentation devices 114 may include, without limitation, a plasma display, a liquid crystal display (LCD), a display based on light emitting diodes (LEDs), organic light emitting diodes (OLEDs), polymer light emitting diodes (PLEDs), and/or surface-conduction electron emitters (SEDs), a speaker, an alarm, and/or any other device capable of presenting information to a user.

In an exemplary embodiment, presentation device 114 is used to display one or more game images, symbols, and/or indicia such as a visual representation or exhibition of movement of an object (e.g., a mechanical, virtual, or video reel), dynamic lighting, video images, and the like. In an alternative embodiment, presentation device 114 displays images and indicia using mechanical means. For example, presentation device 114 may include an electromechanical device, such as one or more rotatable reels, to display a plurality of game or other suitable images, symbols, or indicia.

As described below, in one embodiment, gaming machine 100 is configured to present a Class II game, and more particularly, a bingo game having one or more results displayed as one or more secondary events, such as a Class III game-type event. In one embodiment, the bingo game information is displayed on at least one of presentation devices 114, as is the Class III-type result event.

In one embodiment, gaming machine 100 randomly generates game outcomes using probability data. For example, each game outcome is associated with one or more probability values that are used by gaming machine 100 to determine the game output to be displayed. Such a random calculation may be provided by a random number generator, such as a true random number generator (RNG), a pseudo-random number generator (PNG), or any other suitable randomization process.

Figure 2:
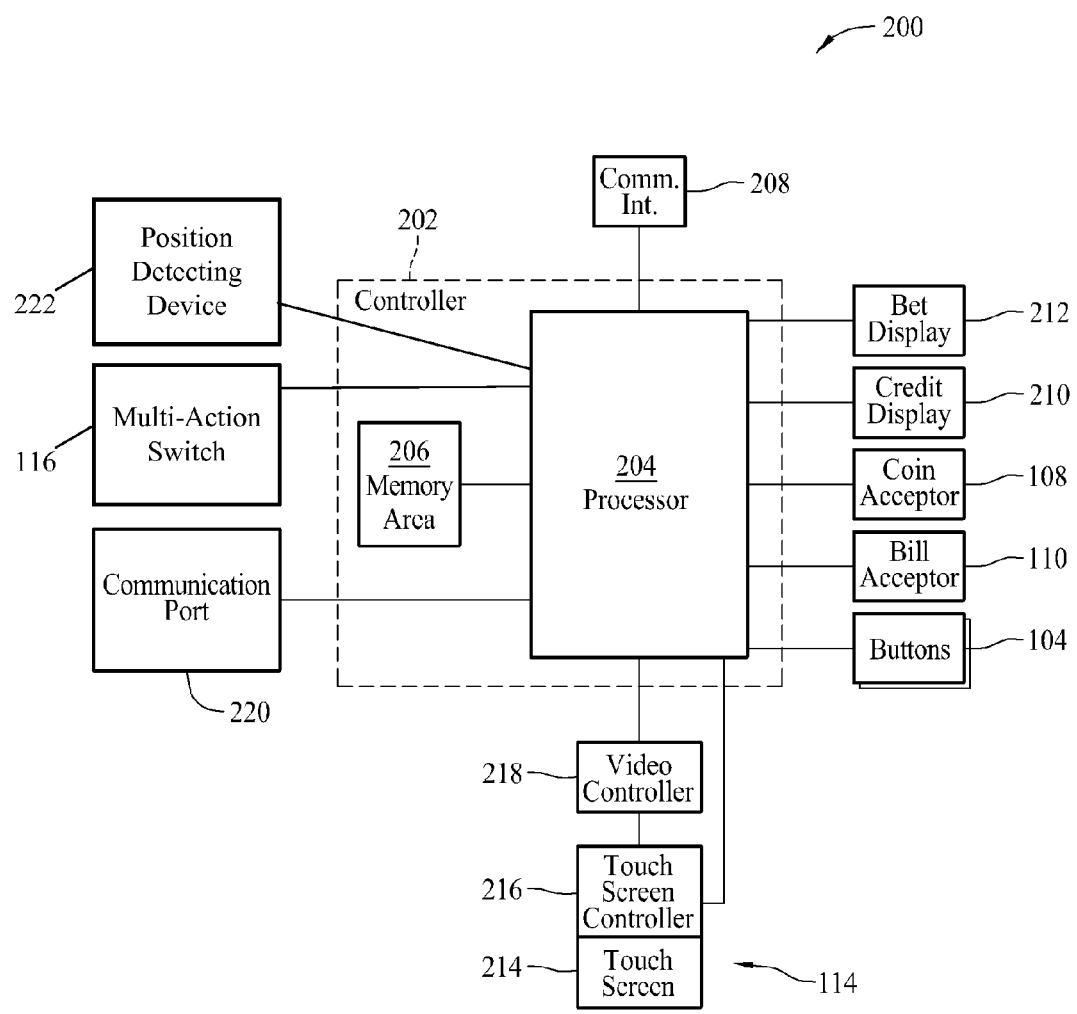
FIG. 2 is a schematic block diagram of an exemplary electrical architecture that may be used with the gaming machine shown in FIG. 1.

FIG. 2 is a schematic block diagram of an exemplary electrical architecture 200 that may be used with gaming machine 100. In the exemplary embodiment, gaming machine 100 includes a gaming machine controller 202 having a processor 204 communicatively coupled to a memory area 206, multi-action switch 116, and a position detecting device 222. Moreover, in the exemplary embodiment, processor 204 and memory area 206 reside within cabinet 102 (shown in FIG. 1) and may be collectively referred to herein as a "computer" or "controller." Gaming machine 100 is configurable and/or programmable to perform one or more operations described herein by programming processor 204. For example, processor 204 may be programmed by encoding an operation as one or more executable instructions and providing the executable instructions in memory area 206.

Controller 202 communicates with one or more other gaming machines 100 or other suitable devices via a communication interface 208. Communication interface 208 may operate as an input device (e.g., by receiving data from another device) and/or as an output device (e.g., by transmitting data to another device). Processor 204 may be a microprocessor, a microcontroller-based platform, a suitable integrated circuit, and/or one or more application-specific integrated circuits (ASICs). However, the above examples are exemplary only, and thus are not intended to limit in any way the definition and/or meaning of the term "processor."

Memory area 206 stores program code and instructions, executable by processor 204, for controlling gaming machine 100. For example, memory area 206 stores data such as image data, event data, player input data, random or pseudo-random number generation software, pay table data, trigger event conditions, game play events, game play outcomes, and/or other information or applicable game rules that relate to game play on gaming machine 100. Moreover, memory area 206 may include one or more forms of memory. For example, memory area 206 can include random access memory (RAM), read-only memory (ROM), flash memory, and/or electrically erasable programmable read-only memory (EEPROM). In some embodiments, other suitable magnetic, optical, and/or semiconductor-based memory may be included in memory area 206 by itself or in combination. In one embodiment, the above data and program code and instructions, executable by processor 204 for enabling a player to execute a plurality of inputs using multi-action switch 116 (e.g., such as non-contact switch shown in FIG. 4) may be stored and executed from a memory area remote from computing device gaming machine 100. For example, the data and the computer-executable instructions may be stored in a cloud service, a database, or other memory area accessible by gaming machine 100. Such embodiments reduce the computational and storage burden on gaming machine 100. As such, memory area 206 may be a local and/or a remote computer storage media including memory storage devices.

In the exemplary embodiment, gaming machine 100 includes a credit display 210, which displays a player's current number of credits, cash, account balance or the equivalent. Gaming machine 100 also includes a bet display 212, which displays a player's amount wagered. Credit display 210 and bet display 212 may be standalone displays independent of presentation device 114, or credit display 210 and bet display 212 may be incorporated into presentation device 114.

Moreover, in an exemplary embodiment, presentation device 114 is controlled by controller 202. In some embodiments, presentation device 114 includes a touch screen 214 and an associated touch screen controller 216. In such embodiments, presentation device 114 may operate as an input device in addition to presenting information. A video controller 218 is communicatively coupled to controller 202 and touch screen controller 216 to enable a player to input game play decisions (e.g., actions) into gaming machine 100 via touch screen 214. Furthermore, gaming machine 100 includes one or more communication ports 220 that enable controller 202 to communicate with external peripheral devices (not shown) such as, but not limited to, external video sources, expansion buses, other displays, a SCSI port, or a key pad.

Figure 3:
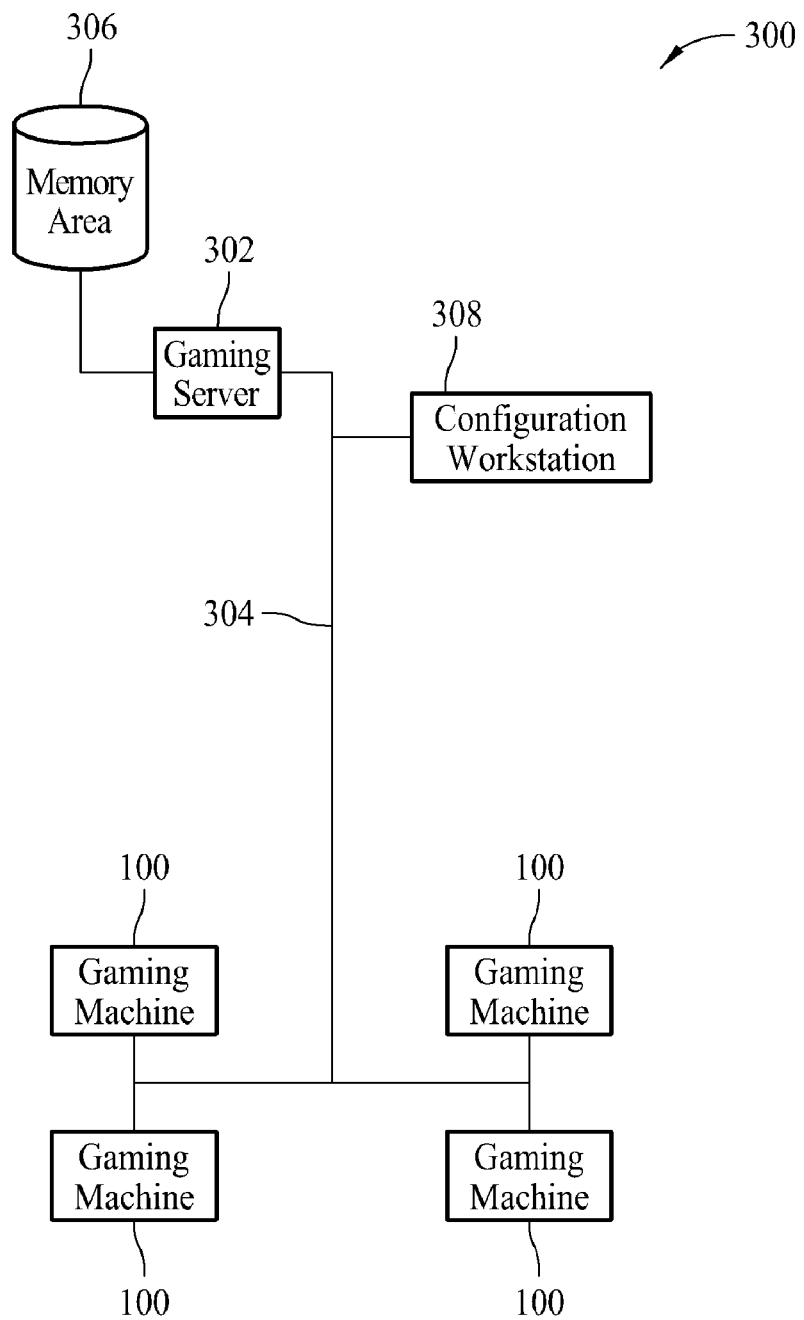
FIG. 3 is a block schematic diagram of an exemplary gaming system that includes a plurality of gaming machines shown in FIG. 1.

FIG. 3 is a block schematic diagram of an exemplary gaming system 300 that includes a plurality of gaming machines 100. Each gaming machine 100 is coupled via communication interface 208 (shown in FIG. 2) to one or more servers, such as a gaming server 302, using a network 304. Gaming server 302 includes a processor (not shown) that facilitates data communication between each gaming machine 100 and other components of gaming system 300. Such data is stored in, for example, a memory area 306, such as a database, that is coupled to gaming server 302.

In one embodiment, one or more gaming machines 100 may be remote gaming machines that access a casino over network 304. As such, a player is able to participate in a game of chance on a remote gaming machine. In this embodiment, it will be understood that a player operating a remote gaming machine has virtual access to any casino coupled to network 304 and associated with gaming server 302. Further, while gaming machines 100 are described herein as video bingo machines, video poker machines, video slot machines, and/or other similar gaming machines that implement alternative games, gaming machines 100 may also be a personal computers coupled to the Internet or to a virtual private network such that a player may participate in a game of chance, remotely. In other embodiments, the player may use a cell phone or other web enabled devices coupled to a communication network to establish a connection with a particular casino. Moreover, gaming machines 100 may be terminal-based machines, wherein the actual games, including random number generation and/or outcome determination, are performed at gaming server 302. In such an embodiment, gaming machines 100 display results of a game via presentation device 114 (shown in FIGS. 1 and 2).

In one embodiment, gaming server 302 performs a plurality of functions including, for example, game outcome generation, executing a game play event for a player, player tracking functions, and/or accounting functions, to name a few. However, in alternative embodiments, gaming system 300 may include a plurality of servers that separately perform these functions and/or any suitable function for use in a network-based gaming system.

Figure 4:
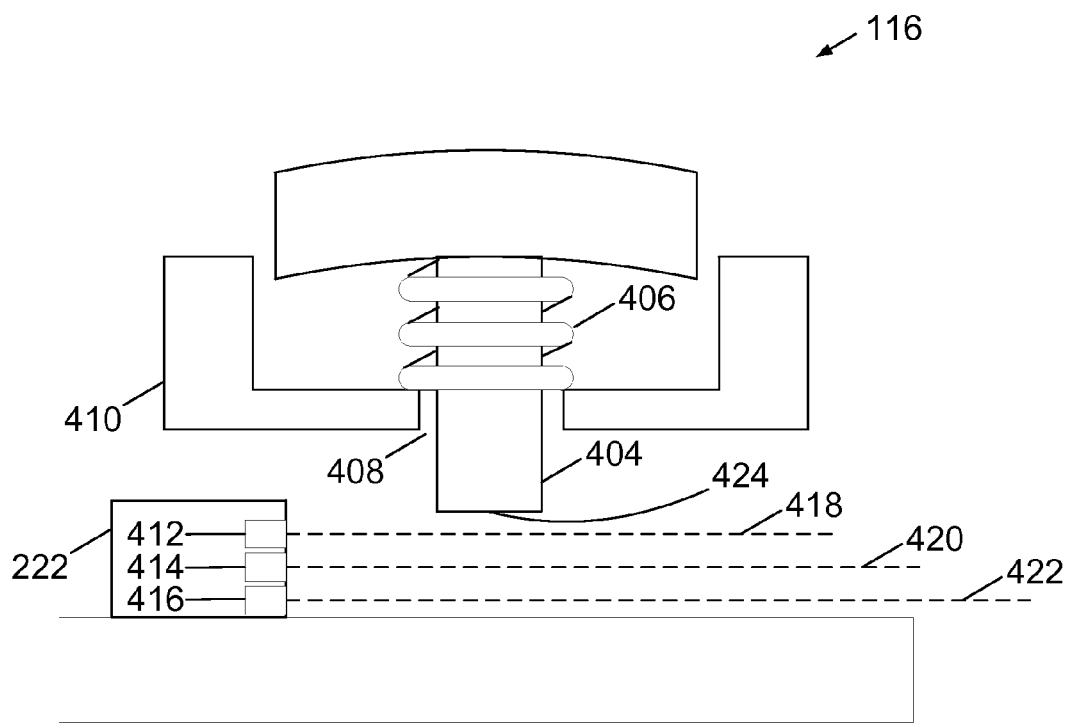
FIGS. 4 and 5 are illustrative examples of a multi-action switch for enabling a player to execute a plurality of inputs on the gaming machine shown in FIG. 1.

With reference now to FIG. 4, exemplary embodiments of a non-contact multi-action switch 116 will now be described. In one embodiment, multi-action switch 116, which can be mounted on gaming machine 100 described above, may be represented as a button (e.g., button 116 in FIG. 1). However, as shown in FIG. 4, button 402 is just one of a plurality of components that make up multi-action switch 116. As shown in FIG. 4, multi-action switch 116 includes a shaft 404 that protrudes from a bottom of button 402 and a coiled spring 406 maybe fitted on shaft 404. Shaft 404 protrudes downward through an aperture 408 opened through a member 410. In one embodiment, coiled spring 406 is held from below by holding member 410 and biases button 402 upward. Thus, coiled spring 406 holds button 402 in an initial position while button 402 is not being pressed.

Multi-action switch 116 further includes a position detecting device 222 (e.g., as shown in FIG. 2). In one embodiment, position detecting device 222 includes a first sensor 412, a second sensor 414, and optionally a third sensor 416. First sensor 412 is associated with a first button press position 418, second sensor 414 is associated with a second button press position 420, and third sensor 416 is associated with a third button press position 422. In one embodiment, sensors 412, 414, and 416 are optical sensors. However, one of ordinary skill in the art guided by the teachings herein will appreciate that embodiments of the present disclosure are not limited to optical sensors. Each of first sensor 412, second sensor 414, and third sensor 416 is configured to provide an output or signal in response to shaft 404, or a bottom 424 of button 402, passing (or reaching) any one of first button press position 418, second button press position 420, and third button press position 422. In one embodiment, the outputs/signals are provided to gaming machine 100 as player inputs, such as inputs to controller 202 of gaming machine 100. These inputs are treated as a request by the player to perform a particular game play event (e.g., bet, daub, and/or claim). In addition, each signal provided to controller 202 by either position detecting device 222, or each of first sensor 412, second sensor 414, and third sensor 416 is unique, in that it can be distinguished from an output of the other sensors and/or it defines a unique event.

In one embodiment, by placing force on button 402, a player may press button 402 from an initial position to first button press position 418, second button press position 420, and third button press position 422. Movement of button 402, and more specifically, shaft 404 that protrudes from a bottom of button 402, from an initial position to, or past, first button press position 418 triggers (e.g., is detected by) first sensor 412, providing a first input. Movement of shaft 404 to, or past, second button press position 420 triggers (e.g., is detected by) second sensor 414, providing a second input or a second and a third input. And, in an embodiment where a third sensor is present, movement of shaft 404 to, or past, third button press position 422 triggers (e.g., is detected by) third sensor 416, providing the third input separately from the second input.

As such, while the player experiences only a single event, that of "pressing" button 402 down once, the movement of button 402 results in the activation or generation of multiple input events. In this manner, a single action by the player can be used to provide multiple player inputs to gaming machine 100. Thus, instead of pressing a button several times for each input or several different buttons once for each input, "bet", "daub", and "claim" may be input by the player by simply pressing button 402 once, for example, past second button press position 420, or in the alternative, past third button press position 422.

It will be appreciated that as button 402 is pressed and shaft 404 moves from an initial position to either second button press position 420 or third button press position 422, button 404 moves through an infinite number of intermediate positions. Thus, exact locations of one or more intermediate positions may vary, as may their total number, and the number of associated sensors and, thus, inputs. Further, as button 402 returns from a pressed position (e.g., from second button press position 420 or third button press position 422), as shaft 404 passes second button press position 420, second sensor 414 is triggered again, providing an additional second input (e.g., "daub"). Thus, a "daub" input may be executed when shaft 404 passes second button press position 420 when button 402 is pressed, and again when shaft 404 passes second button press position 420 when button 402 is released and returns to the initial position.

In one embodiment, feedback is provided to the player as the player presses button 402 past each defined position that provides an input. For example, when button 402 is pressed and shaft 404 passes first button press position 418, the player may receive optical feedback (e.g., color LED), audio feedback (e.g., clicking sounds), and/or tactile feedback (e.g., force resistance, vibration) to let the player know that an input has been executed.

Figure 5:
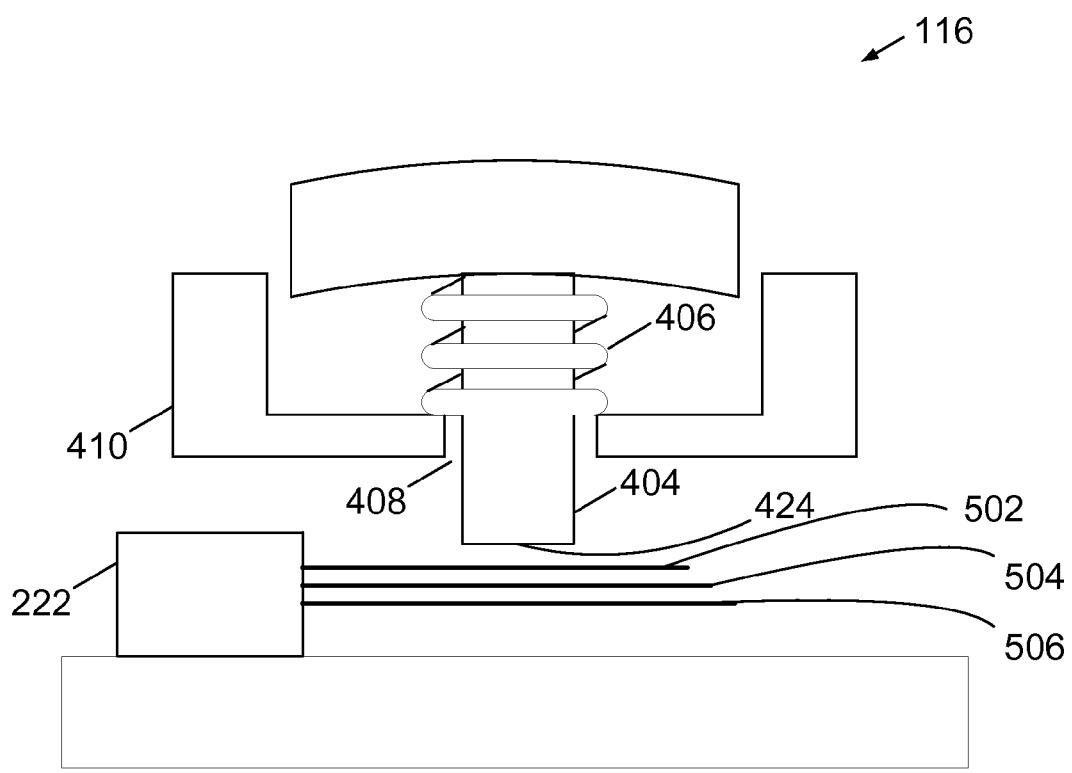

With reference now to FIG. 5, an additional embodiment of multi-action switch 116 is provided. As shown in FIG. 5, instead of using sensors, position detecting device 222 includes a first contact strip 502, a second contact strip 504, and optionally a third contact strip 506. In this embodiment, pressing button 402 initially presses shaft 404 into first contact strip 502. In response to shaft 404 contacting contact strip 502, position detecting device 222 provides a signal to, for example, controller 202 indicative of a first input being executed by a player. A further press of button 402 causes first contact strip 502 to come into contact with second contact strip 504. Thus, in response to shaft 404 contacting contract strip 504, position detecting device 222 provides a signal indicative of a second input being executed by the player. Alternatively, in response to shaft 404 contacting contract strip 504, position detecting device 222 provides a signal indicative of the second input and a third input being executed by the player. However, in an embodiment where multi-action switch 116 includes third contact strip 506, if a further press of button 402 causes second contact strip 504 to contact third contact strip 506, position detecting device 222 provides a signal indicative of the third input (separate from the second input) being executed by the player.

In addition to, or in replace of multi-action switch 116 as shown in FIGS. 4 and 5, in one embodiment, another form of multi-action switch 116 can be provided. For example, multi-action switch 116 may be a capacitive touch screen display with a touch-sensitive surface that is integrated into gaming machine 100. In that event, movement of a player's finger across the surface may affect the generation of multiple inputs. For example, a "bet" icon, a "daub" icon, and a "claim" icon may be provided on the surface. In one embodiment, the "daub" and "claim" icon may be combined into a "daub/claim" icon. Thus, a player can swipe his finger from the bet icon to the daub and/or claim icon without removing his finger from the surface. In this way, the player has provided three different inputs (e.g., bet, daub, claim) in once continuous swipe (e.g., without lifting his finger from the surface). In another embodiment, multiple icons of "bet", "daub", and "claim" may be provided in an arrangement that make it easier for the player to "touch" without the player removing his finger from the surface. For example, the icons can be arranged in a triangle with "bet", "daub", and "claim" being at each corner, or they can be arranged in a circle, in the order of "bet", "daub", "claim", "bet", "daub", and "claim." As such, a player can merely trace the circle of icons with his finger continuously enabling an input to be executed each time his finger comes into contact with an icon. This enables the player to make inputs very rapidly without removing his finger from the surface.

Figure 6:
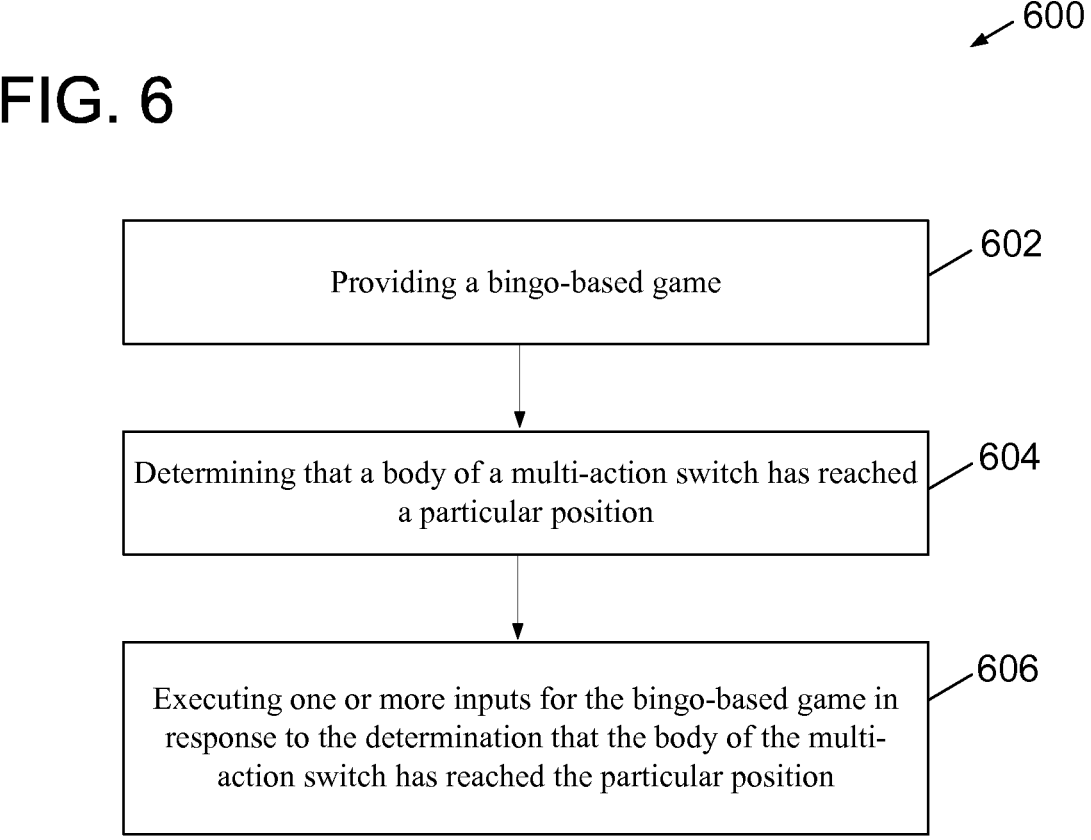
FIG. 6 is a flowchart that illustrates an exemplary method for enabling a player to execute a plurality of inputs through a multi-action switch on the gaming machine shown in FIG. 1.

With reference now to FIG. 6, a flowchart that illustrates an exemplary method 600 for enabling a player to execute a plurality of inputs through multi-action switch 116 on a gaming machine 100 is provided. At 602, a bingo based game is provided to a player via, for example, one of presentation devices 114. A "bingo" game requires at least two players to play the game. As such, when a player provides the "enter game" input (e.g., a request to place a wager), it is determined if there is at least one other player who also wishes to play the bingo game. Once the minimum number of players who desire to play the game is achieved, each participating player is provided with a set of player symbols, such as numbers associated with a game card (e.g., a bingo card) having spaces bearing symbols such as numbers.

After each player is assigned one or more game numbers, such as associated with game cards, game numbers (or other symbols, when the cards bear other symbols) are drawn. In one embodiment, the game numbers are randomly selected, such as by a random number generator (RNG).

As is known, the object of the game is for a player to match game numbers to the numbers on their card(s) to achieve a pattern or number of matches. The numbers may be drawn or generated one at a time, or in groups or sets containing one or more numbers. One or more patterns of matching numbers or symbols are designated game winning combinations. For example, a game winning pattern may be "four corners," "cover-all," "a diagonal" or others.

As game numbers are drawn, the object is to match the game numbers to numbers on the game cards. In one embodiment, the game numbers are displayed to the players. For example, the game numbers may be transmitted from the server to the gaming machines and displayed on the displays thereof.

As is known, the game numbers may be selected in a variety of other fashions. In a traditional manner, the numbers may be printed on balls, and the balls may be randomly drawn. As indicated above, in an electronic game environment, the numbers may be selected with a random number generator.

In one embodiment, a player is required to "daub" matching numbers. The step of daubing results in a confirmation of a match and may include the display of the match on the player's game card. However, a player must provide an input in order for the "daubing" step to be performed, and thus for matching numbers to be indicated so that a player has an opportunity to win the game.

In one embodiment of the game, additional inputs are required in order for the player to complete the game, receive any potential winning outcomes, and be entitled to collect any winnings. For example, in one implementation of Class II bingo-based games as described above, game play continues until a game ending pattern is achieved by a player. Players may be awarded, however, for other patterns which are designated as winning patterns but which are not game-ending. In such a configuration, the number of balls which are initially drawn (or game numbers which are selected) are fewer in number than the number of balls which are required to achieve the game-ending pattern. This ensures that while one or more players may achieve winning patterns after the first ball draw, the game will continue to at least an additional ball draw.

In accordance with this embodiment, the player is required to provide an input to daub game numbers associated with second or subsequent additional ball draws as against matching numbers on the player's card. In addition, a player may also be required to provide a "claim" input in order to claim any winnings associated with winning patterns.

As explained above, multi-action switch 116 enables a player to select one or more inputs, such as a "bet", "daub", and "claim". For example, at 604, and with reference to FIG. 4, a determination can be made as to which of first button press position 418, second button press position 420, and optionally, third button press position 422 button 402 has reached when button 402 is pressed by a player. At 606, one or more inputs for the bingo-based game is executed in response to the determination that button 402 has reached one of first button press position 418, second button press position 420, and third button press position 422. For example, when button 402 reaches second button press position 420, an input signal is generated (e.g., by position detection device 222 or second sensor 414) and provided to controller 202, which indicates that the player wishes to have matching numbers "daubed" and a reward "claimed" if applicable. Further, if third button press position 422 is provided, when button 402 reaches third button press position 422, an input signal is generated (e.g., by position detection device 222 or second sensor 414) and provided to controller 202, which indicates that the player wishes to have the reward "claimed" as a separate input from the "daub" input. However, as explained above, instead of pressing button 402 several times for each input, inputs such as, "daub" and "claim", each of these inputs may be executed by the player by simply pressing button 402 once, for example, past second button press position 420, or third button press position 422. For example, to enable button 402 to be pressed past second button press position 420, button 402 also has to pass second button press position 418. As such, the player presses button 402 past each position, the inputs associated with the positions are executed. Therefore, pressing button 402 from an initial position, past first button press position 418, second button press position 420, and optionally, third button press position 422 enables each input (e.g., bet, daub, and claim) associated with those positions to be executed.

It will be appreciated that the game need not have all of the steps and associated inputs just described, and the game may require additional inputs. For example, the game may require the player to provide a "daub" input for each successive ball or game number draw, and there may be more than two such draws.

In one embodiment, the user may be permitted to make or provide a plurality of inputs, which inputs are "stored." For example, at the beginning of a game which requires a minimum number of inputs in order for the player to complete the game, the player may be permitted to provide those inputs even before certain events for which inputs are required have occurred. In the above-referenced example of a Class II bingo-type game, a player may be permitted to press button 402 past first button press position 418, to enter a "bet" and thereby enter a game. However, if the player continues to press button 402 past second button press position 420 and provide the "daub" and "claim" inputs, the player's input of the "daub" and "claim" inputs may actually occur before bingo balls or game numbers are drawn or shown to be drawn. In this situation, the player's inputs may be stored (e.g., in a queue) or otherwise be received and then associate with those actions as they occur later in the game.

One of ordinary skill in the art, guided by the teaching herein will appreciate that one or more operations in method 600 may be performed repeatedly. For example, game play events may be received repeatedly, and at least a portion of the steps described above may be performed based on each game play event.

Further, the systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer, controller, or server, such as those described herein, includes at least one processor or processing unit and a system memory. The computer, controller, or server typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present disclosure is described in connection with an exemplary gaming system environment, embodiments of the present disclosure are operational with numerous other general purpose or special purpose gaming system environments or configurations. The gaming system environment is not intended to suggest any limitation as to the scope of use or functionality of any aspect of the disclosure. Moreover, the gaming system environment should not be interpreted as having any dependency or requirement relating to any one or combination of components illustrated in the exemplary operating environment.

Embodiments of the present disclosure may be described in the general context of computer-executable instructions, such as program components or modules, executed by one or more computers or other devices. Aspects of the present disclosure may be implemented with any number and organization of components or modules. For example, aspects of the present disclosure are not limited to the specific computer-executable instructions or the specific components or modules illustrated in the figures and described herein. Alternative embodiments of the present disclosure may include different computer-executable instructions or components having more or less functionality than illustrated and described herein.

The order of execution or performance of the operations in the embodiments of the present disclosure illustrated and described herein is not essential, unless otherwise specified. That is, the operations may be performed in any order, unless otherwise specified, and embodiments of the present disclosure may include additional or fewer operations than those disclosed herein. For example, it is contemplated that executing or performing a particular operation before, contemporaneously with, or after another operation is within the scope of aspects of the present disclosure.

In some embodiments, the term "database" refers generally to any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, PostgreSQL, and SQLite. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

When introducing elements of aspects of the present disclosure or embodiments thereof, the articles "a," "an," "the," and "said" are intended to mean that there are one or more of the elements. The terms "comprising," "including," and "having" are intended to be inclusive and mean that there may be additional elements other than the listed elements.

The present disclosure uses examples to disclose the best mode, and also to enable any person skilled in the art to practice the claimed subject matter, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gaming machine comprising:
   a display device configured to display a bingo-based game;
   a multi-action switch including a body moveable along a fixed path, wherein the body of the multi-action switch is held in an initial position when the body of the multi-action switch is not being pressed, and wherein the fixed path includes a first position at a first distance from the initial position, a second position at a second distance from the initial position, and a third position at a third distance from the initial position, wherein the third distance is greater than the second distance and the first distance, and the second distance is greater than the first distance;
   a position detection device configured to detect whether the body of the multi-action switch is in the initial position and whether the body of the multi-action switch has reached the first position, the second position, or the third position along the fixed path when the body of the multi-action switch is being pressed; and
   a game controller configured to control gaming operations of the gaming machine in accordance with the position of the multi-action switch, such that the game controller carries out a first gaming operation of the bingo-based game when the position detection device detects that the multi-action switch has reached the first position, a second gaming operation of the bingo-based game when the position detection device detects that the multi-action switch has reached the second position, and a third gaming operation of the bingo-based game when the position detection device detects that the multi-action switch has reached the third position, wherein the second gaming operation includes a function of the first gaming operation.

2. A gaming machine in accordance with claim 1, wherein the position detection device comprises a plurality of sensors respectively configured to detect when the multi-action switch has reached the first position, the second position, and the third position.

3. A gaming machine in accordance with claim 1, wherein the first gaming operation comprises initiating a play of the bingo-based game.

4. A gaming machine in accordance with claim 1, wherein the game controller is further configured to:
   display a bingo card on the display device, the bingo card comprising a plurality of numbers;

receive a ball call, the ball call providing a ball with a particular number; and based on a determination that the body of the multi-action switch has reached the second position, executing the second gaming operation that includes the particular number from the received ball call.

5. A gaming machine in accordance with claim 1, wherein the game controller is further configured to:

display a bingo card on the display device, the bingo card comprising a plurality of numbers;

receive a ball call, the ball call providing a ball with a particular number;

based on a determination that the body of the multi-action switch has reached the second position, execute the second gaming operation and provide an indication that the player has won a reward; and in response to the determination that the body of the multi-action switch has reached the third position, executing the third gaming operation that includes the particular number from the received ball call and claim the reward.

6. A gaming machine in accordance with claim 1, wherein the third gaming operation comprises the game controller executing each of the following:

initiate a play of the bingo-based game;

daub a portion of a bingo card that includes a particular number from a received ball call; and claim a reward for the bingo-based game.

7. A method for enabling a player to execute a plurality of gaming operations through a multi-action switch on a gaming machine, the multi-action switch including a body moveable along a fixed path, the fixed path including an initial position at which the body of the multi-action switch is held when force is not applied to the body, a first position at a first distance along the fixed path from the initial position, a second position at a second distance along the fixed path from the initial position, a third position at a third distance along the fixed path from the initial position, the third distance being greater than the second distance, and the second distance being greater than the first distance, the method comprising:

providing, by at least one processor, a bingo-based game;

determining, by the at least one processor, whether the body of the multi-action switch is in the initial position and whether the body of the multi-action switch has reached the first position, the second position, or the third position along the fixed path when force is applied to the body of the multi-action switch; and executing, by the at least one processor, at least one of the plurality of gaming operations for the bingo-based game according to the position of the multi-action switch, including:

a first gaming operation for the bingo-based game when it is determined that the multi-action switch has reached the first position, a second gaming operation for the bingo-based game when it is determined that the multi-action switch has reached the second position, wherein at least the second gaming operation includes a function of the first gaming operation and a third gaming operation for the bingo-based game when it is determined that the multi-action switch has reached the third position.

8. A method in accordance with claim 7, wherein the third gaming operation comprises:

initiating a play of the bingo-based game;

daubing a portion of a bingo card that includes a particular number from a received ball call; and claiming a reward for the bingo-based game.

9. A method in accordance with claim 7, wherein the first gaming operation comprises initiating a play of the bingo-based game.

10. A method in accordance with claim 7, wherein the second gaming operation comprises daubing of a portion of a bingo card that includes a particular number from a received ball call.

11. A method in accordance with claim 7, wherein the third gaming operation comprises claiming of a reward for the bingo-based game.

12. A method in accordance with claim 7, wherein the third gaming operation comprises:

placing a wager on the bingo-based game;

daubing a portion of a bingo card that includes a particular number from a received ball call; and claiming a reward for the bingo-based game.

13. A method in accordance with claim 7, further comprising:

in response to determining that the body of the multi-action switch has reached the first position, the second position, or the third position along the fixed path, providing, by the at least one processor, at least one of the following:

optical feedback;

audio feedback; and tactile feedback.

14. A multi-action switch that enables a player to execute a plurality of different gaming operations in a bingo-based game, the multi-action switch comprising:

a button comprising a top surface, the button configured to be moveable down a fixed path by applying force to the top surface of the button, the fixed path including an initial position at which the button is held when force is not applied to the top surface, a first position at a first distance from the initial position, a second position at a second distance from the initial position, and a third position at a third distance from the initial position, wherein the third distance is greater than the second distance, and the second distance is greater than the first distance; and a position detecting device configured to:

detect whether the button is in the initial position and whether the button has reached the first position, the second position, or the third position along the fixed path when force is applied to the top surface of the button;

in response to detecting the button has reached the first position, executing a first gaming operation of the bingo-based game;

in response to detecting the button has reached the second position, executing a second gaming operation of the bingo-based game; and in response to detecting the button has reached the third position, executing a third gaming operation of the bingo-based game;

wherein at least the second gaming operation includes a function of the first gaming operation.

15. A multi-action switch in accordance with claim 14, wherein the first gaming operation comprises placement of a wager in the bingo-based game.

16. A multi-action switch in accordance with claim 14, wherein the second gaming operation comprises daubing a portion of a bingo card that includes a particular number from a received ball call.

17. A multi-action switch in accordance with claim 16, wherein the second gaming operation further comprises placement of a wager in the bingo-based game.

18. A multi-action switch in accordance with claim 14, wherein the third gaming operation comprises daubing a portion of a bingo card that includes a particular number from a received ball call and claiming a reward.

19. A multi-action switch in accordance with claim 14, wherein the third gaming operation comprises placement of a wager in the bingo-based game, daubing a portion of a bingo card that includes a particular number from a received ball call, and claiming a reward for the bingo-based game.

20. A multi-action switch in accordance with claim 14, wherein the fixed path of the switch comprises a linear path.

\* \* \* \* \*